US012661723B2

(12) United States Patent
Chung et al.

(10) Patent No.: US 12,661,723 B2
(45) Date of Patent: Jun. 23, 2026

(54) CUTTING APPARATUS FOR FUEL BASKET CONTAINING SPENT NUCLEAR FUEL IN HEAVY WATER REACTOR

(71) Applicant: KOREA HYDRO & NUCLEAR POWER CO., LTD., Gyeongju-si (KR)

(72) Inventors: Sunghwan Chung, Daejeon (KR); Yongdeog Kim, Daejeon (KR); Kiyoung Kim, Daejeon (KR); Taehyeon Kim, Daejeon (KR); Donghee Lee, Daejeon (KR); Jinwon Son, Daejeon (KR); Dong-Gyu Lee, Anyang-si (KR); In-Su Jung, Daejeon (KR); Ke-Hyung Yang, Seoul (KR); Jun-Sang Jang, Seoul (KR); Tae-Su Kim, Seoul (KR)

(73) Assignee: Korea Hydro & Nuclear Power Co., Ltd., Gyeongju-si (KR)

( * ) Notice: Subject to any disclaimer, the term of this patent is extended or adjusted under 35 U.S.C. 154(b) by 552 days.

(21) Appl. No.: 18/249,754

(22) PCT Filed: Oct. 21, 2021

(86) PCT No.: PCT/KR2021/014818
§ 371 (c)(1),
(2) Date: Apr. 20, 2023

(87) PCT Pub. No.: WO2022/086223
PCT Pub. Date: Apr. 28, 2022

(65) Prior Publication Data
US 2024/0001459 A1 Jan. 4, 2024

(30) Foreign Application Priority Data
Oct. 22, 2020 (KR) ........................ 10-2020-0137316

(51) Int. Cl.
*B23C 1/14* (2006.01)
*B23Q 1/48* (2006.01)
(Continued)

(52) U.S. Cl.
CPC .............. *B23C 1/14* (2013.01); *B23Q 1/4852* (2013.01); *B23Q 39/026* (2013.01); *B23C 1/10* (2013.01)

(58) Field of Classification Search
CPC .......... B23Q 1/62; B23Q 1/621; B23Q 1/623; B23Q 1/012; B23Q 1/4852; B23Q 1/03;
(Continued)

(56) References Cited

U.S. PATENT DOCUMENTS 3,657,963 A * 4/1972 Miller .................. B23Q 1/5437
408/90
3,724,291 A * 4/1973 Goebel ................ B23Q 16/065
74/813 L
(Continued)

FOREIGN PATENT DOCUMENTS

CN 108788258 A * 11/2018 ............... B23C 1/14
DE 102017120471 A1 * 3/2019 .............. B27M 1/08
(Continued)

*Primary Examiner* — Nicole N Ramos
(74) *Attorney, Agent, or Firm* — You & IP, LLC

(57) ABSTRACT

Proposed is a cutting apparatus for a fuel basket accommodating spent nuclear fuel of a heavy water reactor, wherein the apparatus includes a base, a vertical support arranged on one side of the base; a turn table arranged to be reciprocated between one side and an opposite side of the base and be horizontally rotatable on the base; a horizontal support arranged to extend from an upper-end of the vertical support in a horizontal direction toward the turn table; a side-cutting means arranged on the vertical support protruding toward the turn table for cutting a side welding bead of the fuel basket mounted on the turn table; and an upper-cutting means arranged on the horizontal support protruding toward (Continued)

the turn table for cutting an upper welding bead of the fuel basket mounted on the turn table.

6 Claims, 12 Drawing Sheets

(51) Int. Cl.
    *B23Q 39/02*         (2006.01)
    *B23C 1/10*         (2006.01)

(58) Field of Classification Search
    CPC .... B23Q 1/25; B23Q 1/26; B23Q 7/02; B23C
                          2215/085; B23C 1/12
    See application file for complete search history.

(56)              References Cited

U.S. PATENT DOCUMENTS

| | | | | |
|---|---|---|---|---|
| 3,948,144 | A * | 4/1976 | Nagano | B23Q 27/006 |
| | | | | 409/165 |
| 4,003,556 | A | 1/1977 | Roeder | |
| 4,015,487 | A * | 4/1977 | Pfister | B23Q 16/102 |
| | | | | 74/813 L |
| RE31,288 | E * | 6/1983 | Matsuzaki | B23Q 3/15506 |
| | | | | 409/211 |
| 8,172,489 | B2 * | 5/2012 | Prust | B23B 31/16287 |
| | | | | 269/134 |
| 10,610,989 | B1 * | 4/2020 | Liu | B23B 31/16 |
| 2012/0308321 | A1 | 12/2012 | Onishi | |
| 2018/0272487 | A1 * | 9/2018 | Watanabe | B25J 9/0096 |

FOREIGN PATENT DOCUMENTS

| | | | | | |
|---|---|---|---|---|---|
| FR | 1348188 | A * | 1/1964 | | |
| GB | 849692 | A * | 9/1960 | | B23C 1/10 |
| GB | 876771 | A * | 9/1961 | | B23C 1/10 |
| GB | 2156712 | A * | 10/1985 | | B23Q 39/026 |
| JP | 2004-020321 | A | 1/2004 | | |
| JP | 2004-347349 | A | 12/2004 | | |
| KR | 10-2013-0097407 | A | 9/2013 | | |
| KR | 10-1705995 | B1 | 2/2017 | | |
| KR | 10-1845493 | B1 | 4/2018 | | |
| KR | 10-1857398 | B1 | 5/2018 | | |
| KR | 10-1963587 | B1 | 3/2019 | | |

* cited by examiner

FB

FA

340(342)

340(341)

330

CUTTING APPARATUS FOR FUEL BASKET CONTAINING SPENT NUCLEAR FUEL IN HEAVY WATER REACTOR

TECHNICAL FIELD

The present disclosure relates to a cutting apparatus for a fuel basket accommodating spent nuclear fuel of a heavy water reactor and, more particularly, to a cutting apparatus for a fuel basket accommodating spent nuclear fuel of a heavy water reactor that cuts only the welded bead of the fuel basket instead of cutting through the fuel basket, so that the cover and the body of the fuel basket can be separated without damaging the spent nuclear fuel, and easily recovering cutting chips generated during the cutting process.

BACKGROUND ART

In general, spent fuel refers to nuclear fuel material used as fuel for a nuclear reactor or nuclear fuel material that has undergone nuclear fission by other methods and is called high-level radioactive waste as contrasted with low- and intermediate-level radioactive waste from gloves, clothes, and the like of operators at nuclear power plants. Such spent fuel is no different from pre-spent fuel in appearance. However, such spent fuel has high radioactivity due to fission products having been generated during the nuclear fission reaction in the nuclear reactor and continuously generates heat even after the fission reaction is over. Therefore, such spent fuel is not to be allowed to come into direct contact with people when handled or stored and needs to be handled outside the shielding structure that blocks the radiation. Prior to final disposal in an underground landfill, such spent nuclear fuel is stored in a storage place in a state of being accommodated into a specially designed storage container. In this case, first, the spent nuclear fuel is kept in the Spent Fuel Bay (SFB) located inside the building and subjected to a long period of cooling, and only the spent nuclear fuel, which has been cooled in the SFB for more than 6 years and thus generates very little decay heat, is transported to and stored in a Spent Fuel Dry Storage Facility (SFDSF) outside the building. At this time, the spent nuclear fuel is transferred to the storage basket FB provided by being made of stainless steel as shown in FIG. 1 through underwater work in the SFB, and the storage basket FB containing 60 bundles of spent nuclear fuel FA therein is moved to a Shielded Work Station (SWS) arranged on top of the SFB and dried with hot air. When the drying of the spent nuclear fuel is finished, a lid of the storage basket FB is closed and sealing welding is performed by remote operation. The storage basket FB that is sealed is inserted into a Fuel Basket Transport Flask (FBTF) and then transported to a dry storage facility and stored (kept).

On the other hand, when the fuel basket stored in the dry storage facility is necessary for research and management of the spent nuclear fuel being stored, or when a defect is found in the welding part of the fuel basket, the operator needs to withdraw spent fuel FA from the fuel basket FB and then seal and store again the spent fuel FA in another fuel basket. To this end, after transporting the FB to a wet storage facility, the operator needs to sink the FB into the spent fuel bay (SFB) and cut a welding part of the FB to separate the FB.

However, a cutting device for cutting the FB in the SFB is not well prepared conventionally, and even when a cutting device is provided, there is a problem in that not only does the cutting operation take a great deal of time and effort but also damage may occur to the FA accommodated in the FB as the through-cutting is performed. In addition, the conventional cutting method has a problem in that it is difficult to recover the cutting chips generated during the cutting operation.

Documents of Related Art

[Patent Document] Korean Patent No. 10-1845493

DISCLOSURE

Technical Problem

Accordingly, the present disclosure has been made keeping in mind the above problems occurring in the related art. Here, an objective of the present disclosure is to provide a cutting apparatus for a fuel basket accommodating spent nuclear fuel of a heavy water reactor, which is capable of cutting a welding bead of the fuel basket rather than making the fuel basket subject to through-cutting when a lid and a main body of the fuel basket are separated in order to withdraw spent nuclear fuel, thereby preventing the spent nuclear fuel from being damaged during a cutting process and preventing cutting chips generated during the cutting operation of the fuel basket from being scattered so that the cutting chips are easily recovered.

Technical Solution

In order to accomplish the above objectives, there may be provided a cutting apparatus for a fuel basket accommodating spent nuclear fuel of a heavy water reactor, the cutting apparatus including: a vertical support arranged on one side of the base; a turn table arranged to be reciprocated between one side and an opposite side of the base and be horizontally rotatable on the base; a horizontal support arranged to extend from an upper-end of the vertical support in a horizontal direction toward the turn table; a side-cutting means arranged on the vertical support protruding toward the turn table for cutting a side welding bead of the fuel basket mounted on the turn table; and an upper-cutting means arranged on the horizontal support protruding toward the turn table for cutting an upper welding bead of the fuel basket mounted on the turn table.

In this case, the base may be provided with a scattering-free film in a form of a partition arranged upward along edges thereof.

In addition, the base may include, thereon: guide rails each arranged between one side and the opposite side of the base; a transfer table arranged to be movable along the guide rails and allowing the turn table to be arranged thereon; a worm wheel in a form of a ring arranged to be rotatable on the transfer table and provided with a toothed gear on a circumferential surface thereof; and a worm shaft engaged and coupled with the toothed gear of the worm wheel, wherein the turn table may be coupled with the worm wheel.

In addition, the side-cutting means may include: a bracket fixed to the vertical support; an elevating screw arranged to be rotatable in the bracket; an inclined block screw-coupled with the elevating screw and provided with a downwardly inclined surface to be elevated in a height direction of the bracket by rotation of the elevating screw; a mount having an inclined surface corresponding to the inclined surface of the inclined block and arranged for moving straight toward the fuel basket of the turn table with respect to the bracket while cooperating with elevating action of the inclined block; and an air motor arranged in the mount and a cutting tip generating rotating force by power of the air motor.

In addition, a plurality of clamps may be provided at edges of the turn table to clamp the fuel basket, and a positioning hub to be inserted into a central post of the fuel basket may be provided in a center of the turn table.

Advantageous Effects

A cutting apparatus for a fuel basket accommodating spent nuclear fuel of a heavy water reactor according to the apparatus includes a side-cutting means and an upper-cutting means corresponding to welding parts of the side and upper surfaces of the fuel basket, which is an object to be cut and is rotated by a turn table, and cuts only a welding bead that is a welding part rather than making the fuel basket subject to through-cutting, through cutting means above, so that there is an effect of separating the lid and the main body of the fuel basket without damaging the spent nuclear fuel.

In addition, provided with a shatterproof film in a form of a partition along the circumference of a base, the present disclosure can prevent cutting chips generated during a fuel basket cutting operation from going to bounce out of the base, thereby allowing the cutting chips to be collected on the base. Accordingly, the present disclosure has the effect that the cutting chips can be easily recovered.

In addition, the present disclosure provides an air motor as a power source for the cutting means and installs a pneumatic sensor configured to measure the air pressure supplied to the air motor so that even when the air motor cuts not only the welding bead but also the lid and the body of the fuel basket, by allowing the cutting depth of a cutting tip by the air motor to be monitored through the measurement of the pneumatic sensor, there is an effect of preventing spent nuclear fuel from being damaged during the cutting operation of the fuel basket.

BEST MODE

Terms or words used in the present specification and claims are not limited to usual or dictionary meanings and, on the basis of a principle that the inventor may properly define a concept of a term in order to explain his or her invention in the best way, should be interpreted as meaning and concept consistent with the technical spirit of the present disclosure.

Hereinafter, with reference to FIGS. 2 to 10B attached, a description will be given of a cutting apparatus for a fuel basket accommodating spent nuclear fuel of a heavy water reactor according to an exemplary embodiment of the present disclosure (hereinafter referred to as "cutting apparatus").

The cutting apparatus exactly cuts the side welding part and the upper welding part of the fuel basket FB in the water of a spent fuel bay, so that the spent fuel may be withdrawn without damage. That is, the cutting apparatus is provided to cut only the welding bead, which is a welding part of a lid and a main body, rather than making the fuel basket subject to through-cutting, so that the spent nuclear fuel may be taken out of the fuel basket without damage.

Figure 1:
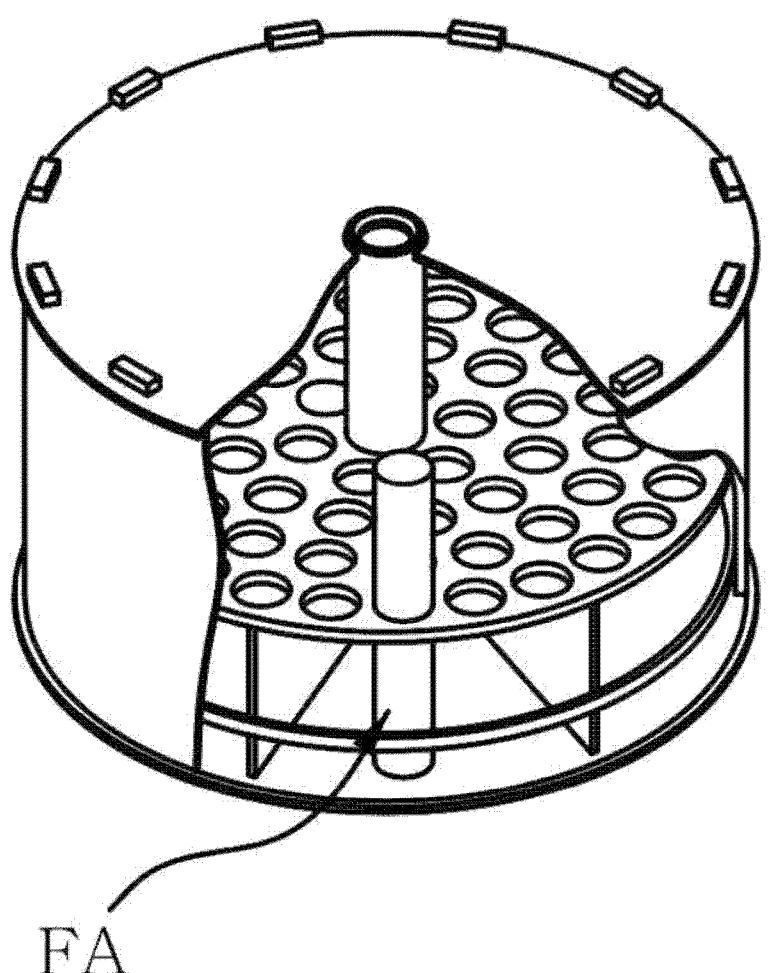
FIG. 1 is a partially cutaway perspective view showing a fuel basket in which spent nuclear fuel is to be accommodated.
Figure 2:
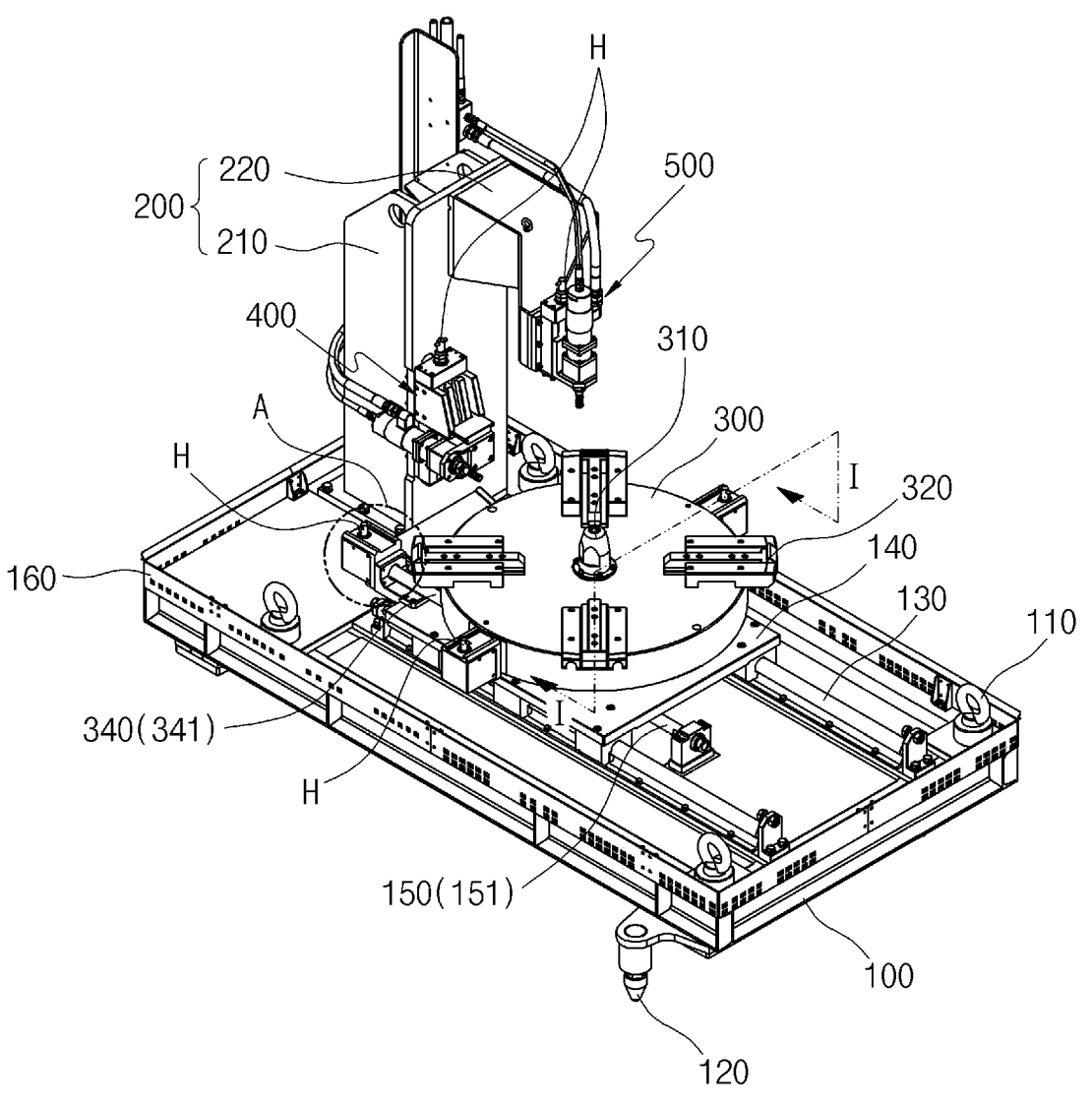
FIG. 2 is a perspective view showing a cutting apparatus for a fuel basket accommodating spent nuclear fuel of a heavy water reactor according to an exemplary embodiment of the present disclosure.
Figure 3:
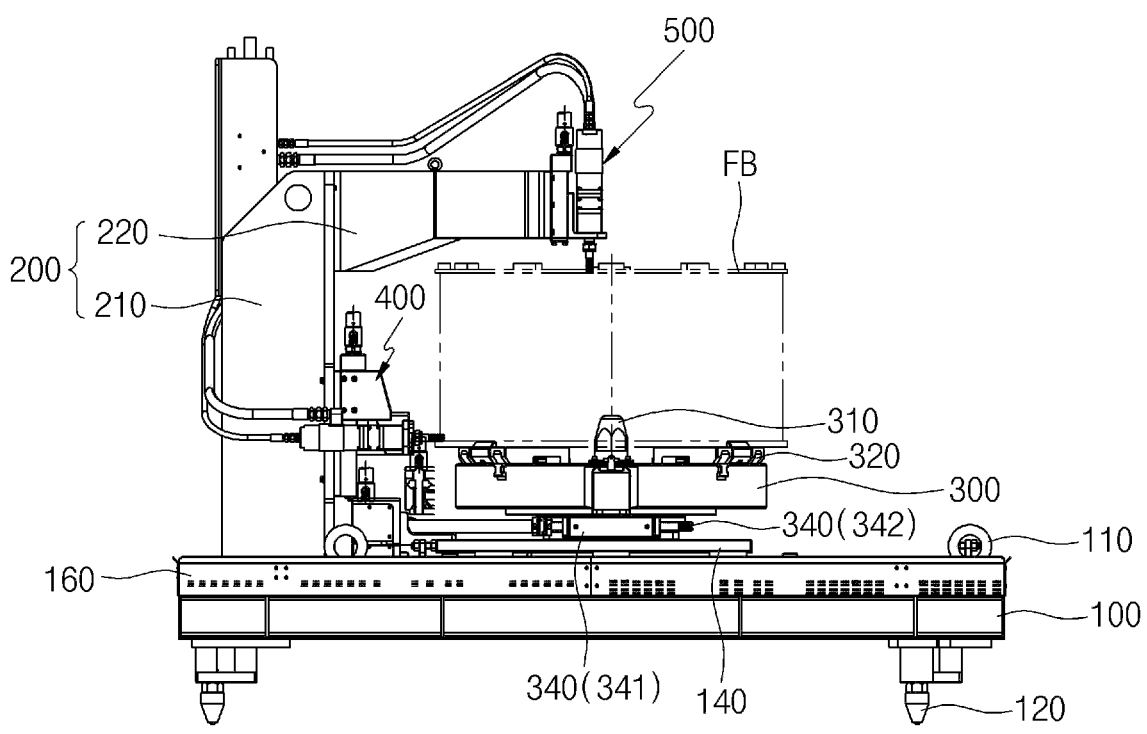
FIG. 3 is a side view showing the cutting apparatus for a fuel basket accommodating spent nuclear fuel of a heavy water reactor according to the exemplary embodiment of the present disclosure.

As shown in FIGS. 2 and 3, the cutting apparatus includes a base 100, a support 200, a turn table 300, a side-cutting means 400, and an upper-cutting means 500.

The base 100 is configured to be supported on the ground and provides a workspace where cutting of the fuel basket FB is performed. The base 100 may be made in a form of a square panel and includes a lifting ring 110 for lifting and a support member 120 supported on the ground. The support 200 and cutting means 400 and 500, to be described later, are arranged on one side of the workspace of the base 100, and guide rails 130 are arranged to provide a path between one side and an opposite side of the base 100 in the workspace of the base 100. At this time, a transfer table 140 capable of reciprocating the guide rails 130 is arranged on the guide rails 130, and the transfer table 140 is arranged for moving straight by a transfer table driving unit 150. At this time, the transfer table driving unit 150 includes a motor (not shown) and a screw shaft 151. Although not shown, the screw shaft 151 and the transfer table 140 are screw-coupled together, and as the screw shaft 151 rotates in forward and reverse directions by the power of the motor, the transfer table 140 may move back and forth between the one side and the opposite side of the base 100. A shatterproof film 160 is arranged on the circumference of the base 100. The shatterproof film 160 is configured to prevent cutting chips generated in a process of separating the fuel basket FB through the cutting means 400 and 500 from going to bounce out of the base 100 and, after the cutting operation is completed, be able to easily recover the cutting chips. The scattering-free film 160 may be provided in a form of a partition in a vertical direction along the circumference of the base 100.

The support 200 is configured to fix the cutting means 400 and 500 and is arranged on one side of the base 100. The support 200 includes a vertical support 210 and a horizontal support 220, wherein the side-cutting means 400 is arranged on the vertical support 210 and the upper-cutting means 500 is arranged on the horizontal support 220.

Figure 4:
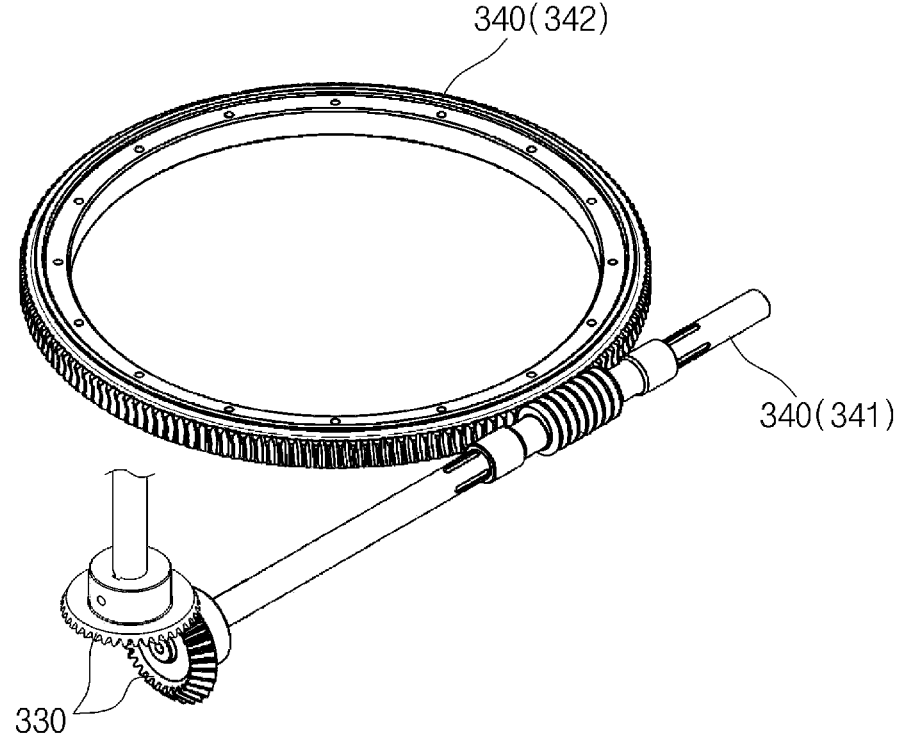
FIG. 4 is a view showing essential parts of a driving structure of a turn table in the cutting apparatus for a fuel basket accommodating spent nuclear fuel of a heavy water reactor according to the exemplary embodiment of the present disclosure.
Figure 5:
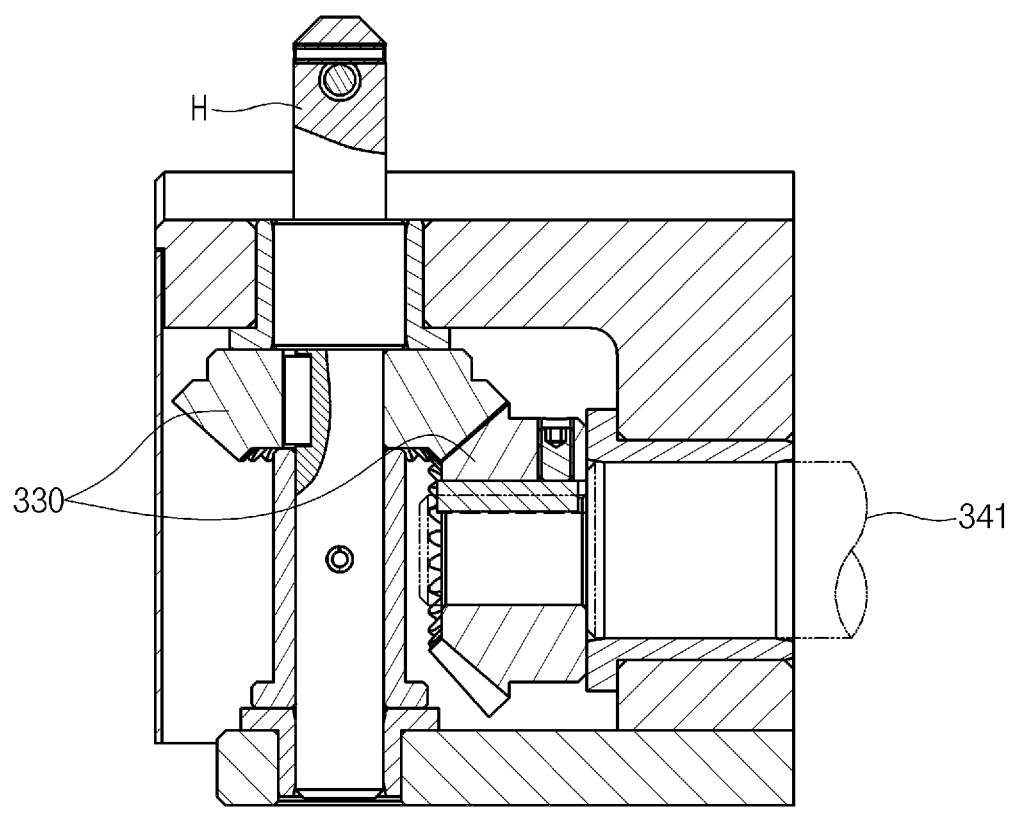
FIG. 5 is a sectional view showing a part "A" in FIG. 2.
Figure 6A:
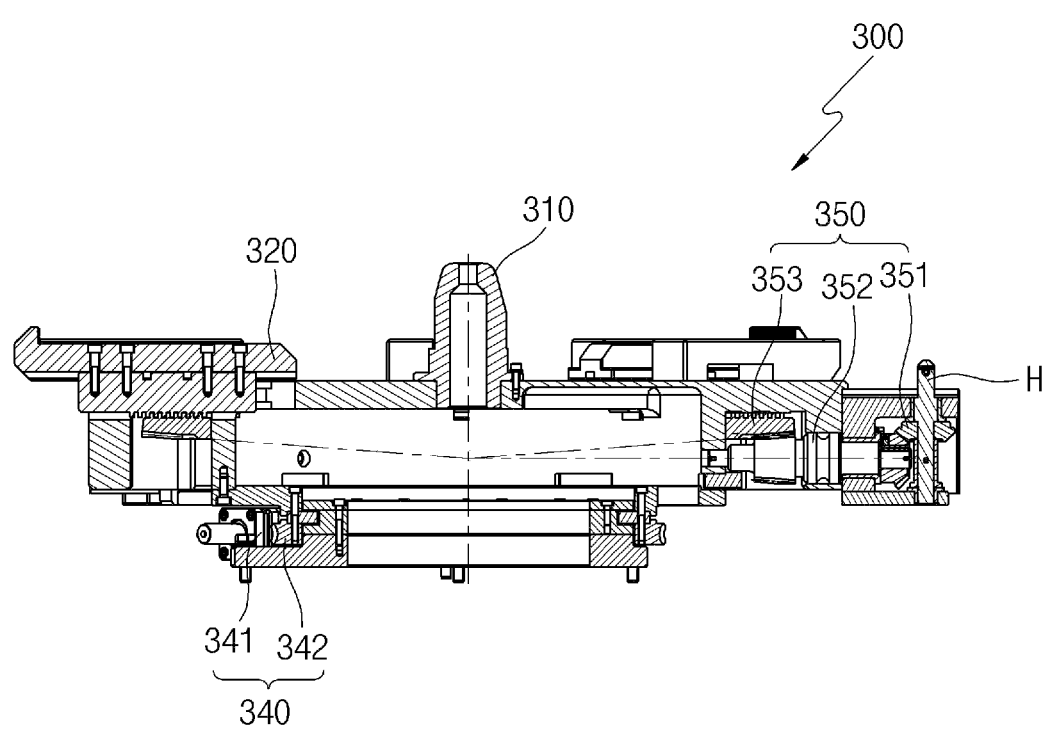
FIG. 6A is a sectional view taken along the line I-I in FIG. 2.
Figure 6B:
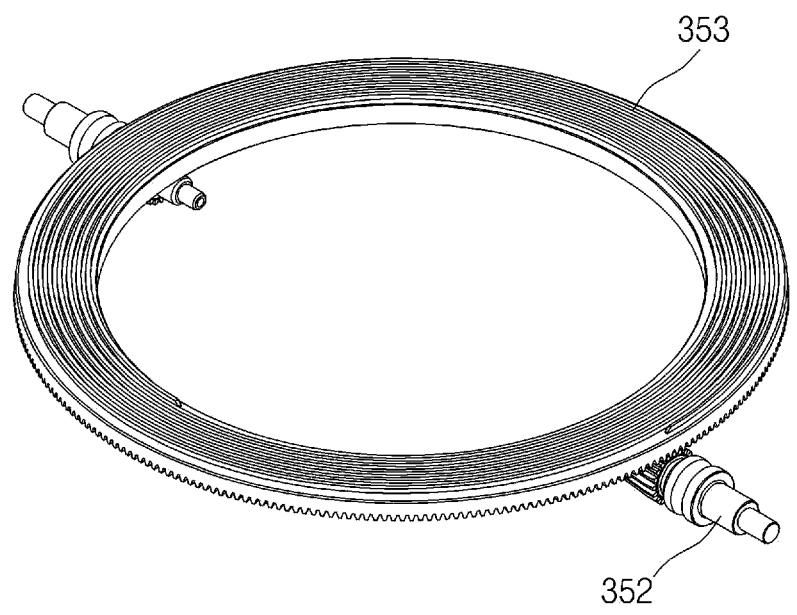
FIG. 6B is a perspective view showing a movable turn plate in the cutting apparatus for a fuel basket accommodating spent nuclear fuel of a heavy water reactor according to the exemplary embodiment of the present disclosure.

The turn table 300 is configured to provide a space in which the fuel basket FB, which is a cutting object, may be seated and cut by the cutting means 400 and 500 to be described later. As shown in FIG. 2, the rotation table 300 may be arranged on the transfer table 150 and arranged to be horizontally rotated with respect to the ground. The turn table 300 includes a positioning hub 310 and clamps 320 as shown in FIGS. 2 and 3 and is arranged so as to be rotated through a bevel gear 330 and a worm gear 340 as shown in FIGS. 4 and 5. The positioning hub 310 serves to provide a guide for the position of the fuel basket FB on the turn table 300 and is provided in a form protruding upward from the turn table 300. The clamps 320 press sides of the fuel basket FB coupled with the positioning hub 310 to serve to restrain the fuel basket FB so as not to be moved on the turn table 300. A plurality of the clamps 320 is provided and is arranged so as to be reciprocally movable straight from the edge of the turn table 300 toward the positioning hub 310, and straight movement of the clamps 320 is performed through the clamp driving unit 350 shown in FIG. 6A. The clamp driving unit 350 includes a bevel gear 351, a transmission shaft 352 that transmits the power of the bevel gear 351, as shown in FIG. 6A, and a ring-shaped movable rotating plate 353 that may be screw-coupled with the clamps 320 as shown in FIG. 6B. A screw thread is provided in the circumferential direction of the moving turn plate 353. That is, by such a configuration, when the handle shaft H shown in FIGS. 2 and 6A is rotated in forward and reverse directions, the bevel gear 351 rotates the transmission shaft 352, and the transmission shaft 352 rotates to rotate the movable turn plate 353. According to this, the clamps 320 screw-coupled with the movable turn plate 353 may clamp the fuel basket FB while moving in a direction of the central axis of the movable turn plate 353.

On the other hand, as described above, the turn table 300 is rotated on the transfer table 140 by the bevel gear 330 and the worm gear 340, and one side of the bevel gear 330 is connected to the handle shaft H protruding upward as shown in FIGS. 2 and 5. As shown in FIG. 4, the worm gear 340 includes a worm shaft 341 connected to an opposite side of the bevel gear 330 and a worm wheel 342 in gear coupling with the worm shaft 341. As shown in FIG. 6A, the worm wheel 342 is arranged between the transfer table 140 and the turn table 300 for interlocking with the turn table 300. By such a configuration, when the bevel gear 330 is rotated by the rotation of the handle shaft H, the worm wheel 342 is rotated as worm shaft 341 connected to the bevel gear 330 is rotated, and accordingly, the turn table 300 may become rotated.

Figure 7:
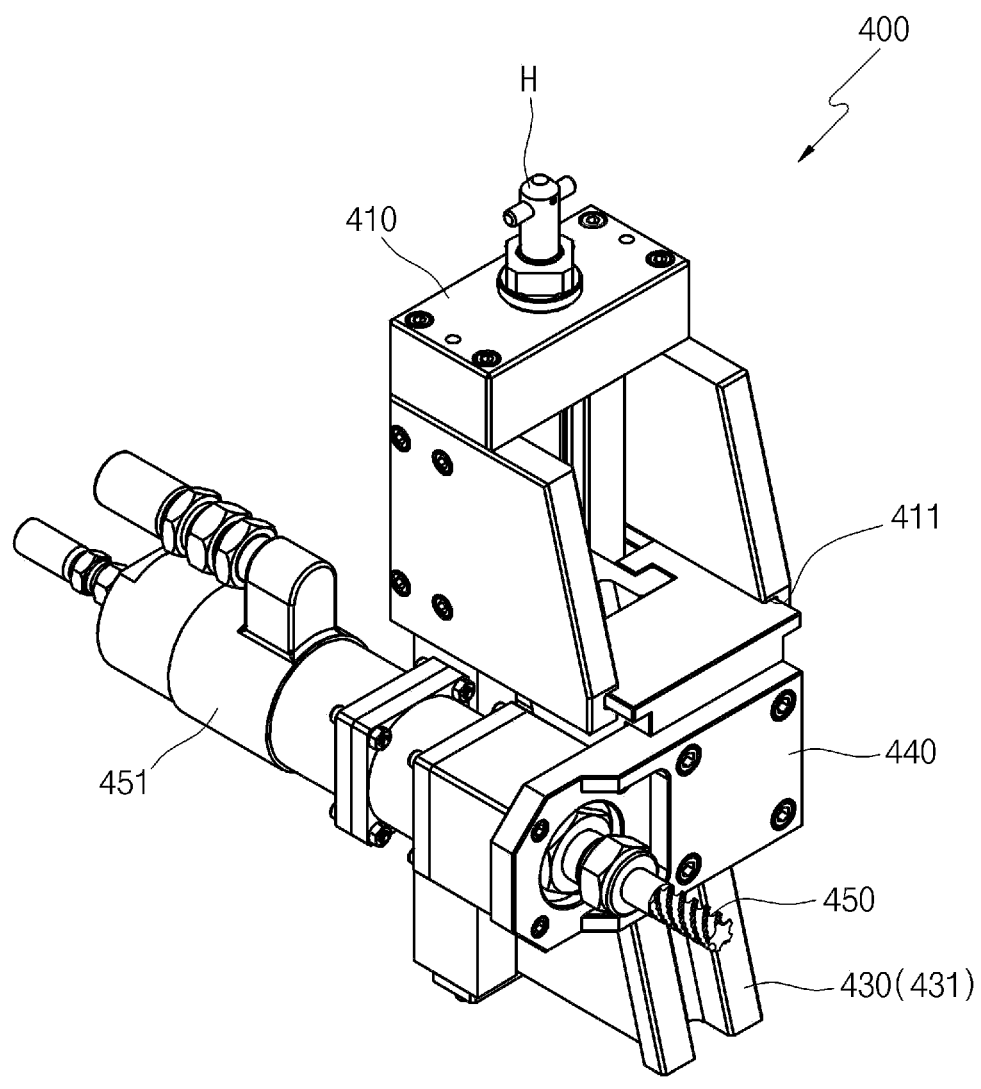
FIG. 7 is a view showing a side cutting means in the cutting apparatus for a fuel basket accommodating spent nuclear fuel of a heavy water reactor according to the exemplary embodiment of the present disclosure.
Figure 8A:
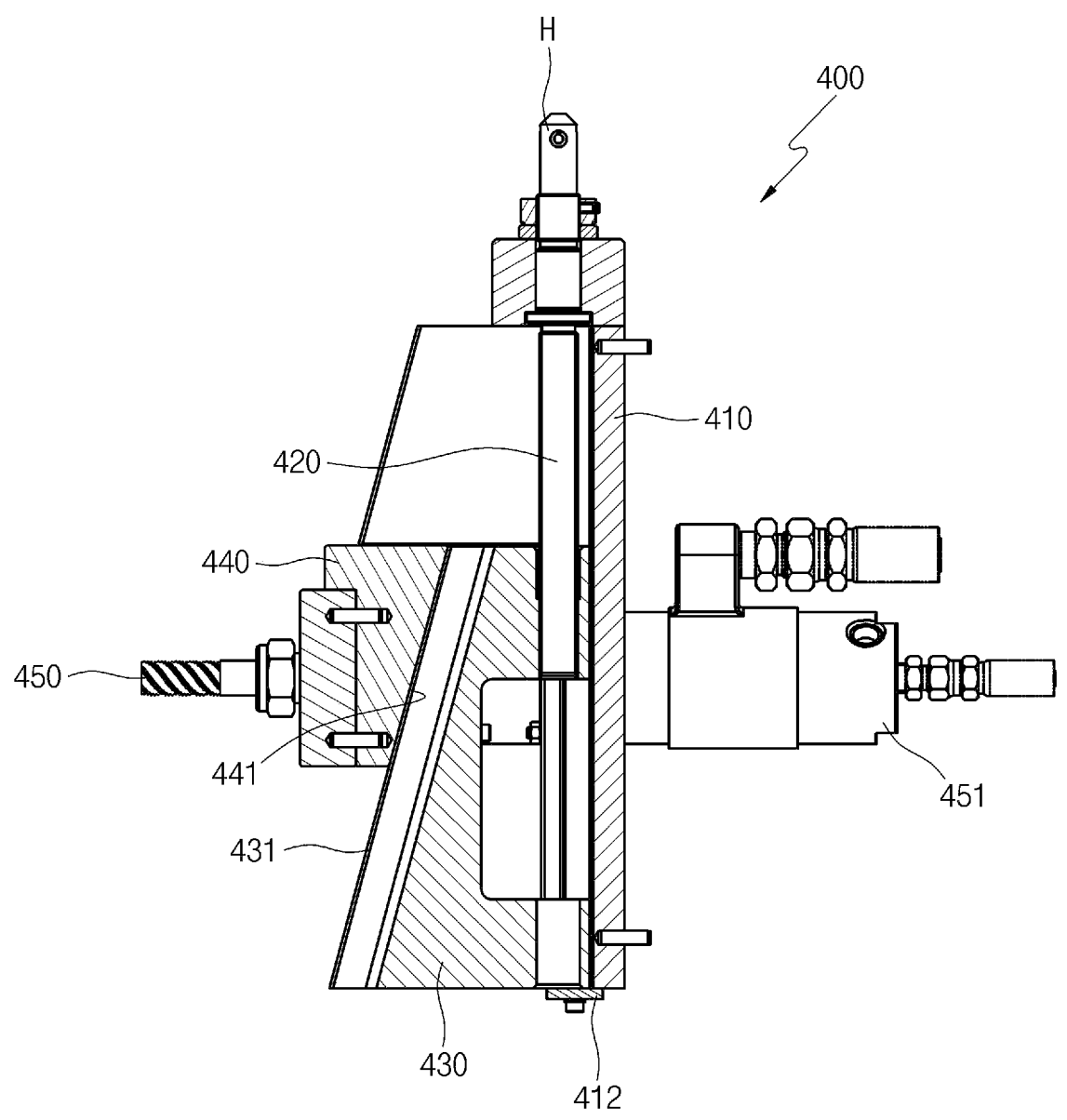
FIGS. 8A and 8B are views showing an operation of the side cutting means of FIG. 7.
Figure 8B:
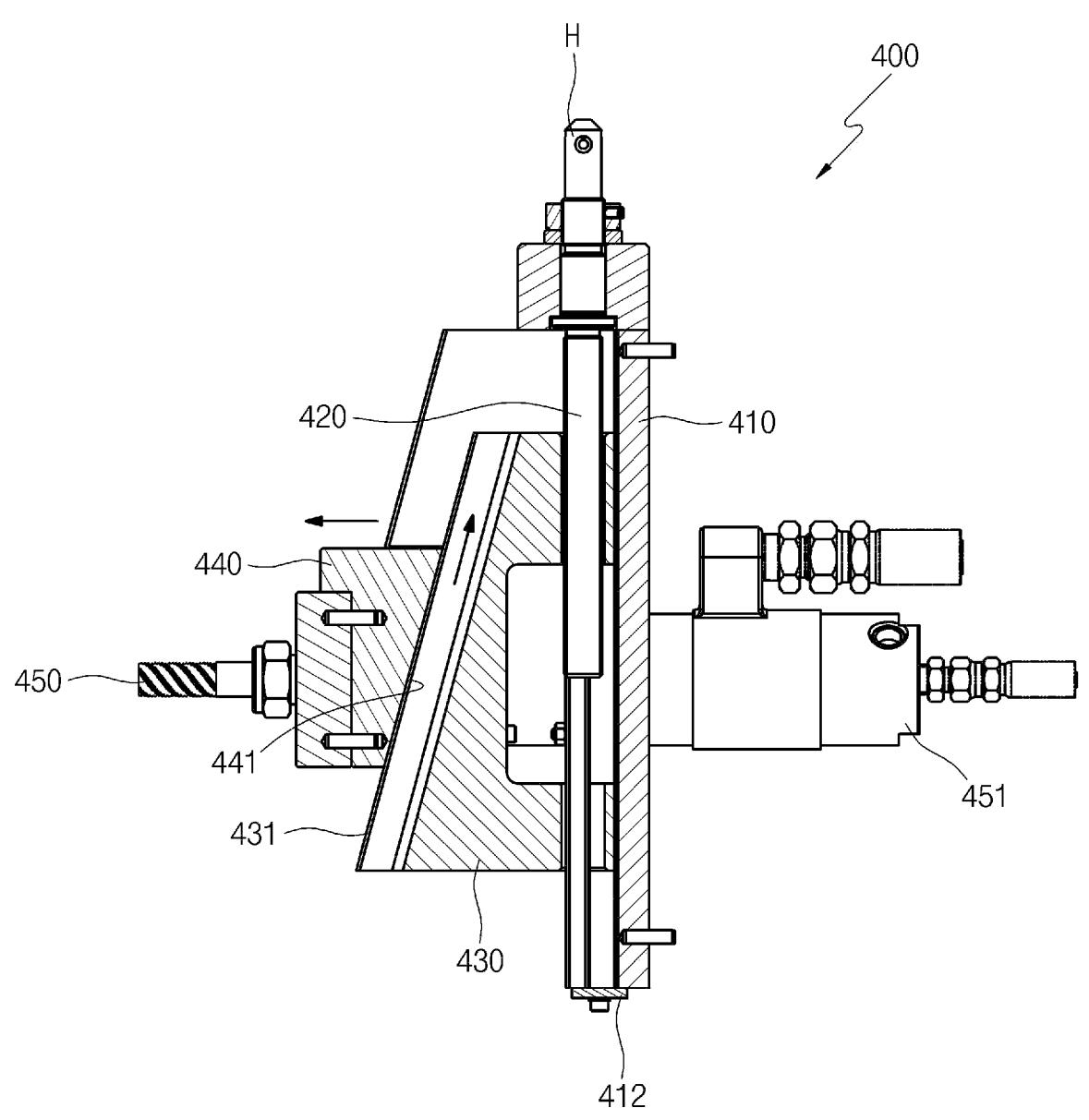

The side-cutting means 400 is configured to cut the welding bead on the side of the fuel basket FB seated on the turn table 300 and, exactly, serves to cut the welding bead provided on the lower side of the fuel basket FB as shown in FIG. 3. The parts where the welding bead of the fuel basket FB is provided are a lower side part and an upper center part, so the side-cutting means 400 is configured to cut the lower part of the side of the fuel basket FB, where one of the welding beads is. The side cutting means 400 is arranged on the vertical support 210 as shown in FIG. 2 and includes a bracket 410, an elevating screw 420, an inclined block 430, a mount 440, and a cutting tip 450 as shown in FIGS. 7 to 8B.

The bracket 410 of the side-cutting means 400 is configured to be fixed to the vertical support 210 and provides a path for the mount 440 to move straight. The bracket 410 provides a guide groove 411, to be described later, through which the mount 440 may move straight, and a stopper 412 is arranged at a lower end of the bracket 410. The stopper 412 is configured to limit excessive descent of the elevating screw 420. The elevating screw 420 is arranged to be rotatable in the bracket 410 and provides a screw thread. As shown in FIGS. 8A and 8B, the elevating screw 420 is screw-coupled with an inclination block 430 to be described later and is provided to elevate the inclination block 430 through rotations in forward and reverse directions. A handle shaft H is arranged at an upper-end part of the elevating screw 420. As described above, the inclined block 430 is screw-coupled with the elevating screw 420 and is provided for elevating with respect to the bracket 410 by rotation of the elevating screw 420. The inclined block 430 provides a downwardly inclined surface 431 that gradually widens from top to bottom. The mount 440 is configured to allow the cutting tip 450 to be arranged therein and provides an inclined surface 441 corresponding to the inclined surface 431 of the inclined block 430 as shown in FIGS. 8A and 8B. The mount 440 is coupled with a guide groove 411 of the bracket 410 and is arranged so as to be moved straight toward the fuel basket FB along the guide groove 411 by the elevating action of the inclined block 430. The cutting tip 450 is configured to directly cut the fuel basket FB and may be provided as an end mill. As shown in FIGS. 7 to 8B, the cutting tip 450 may be arranged to be rotatable by the power of the air motor 451.

Figure 9:
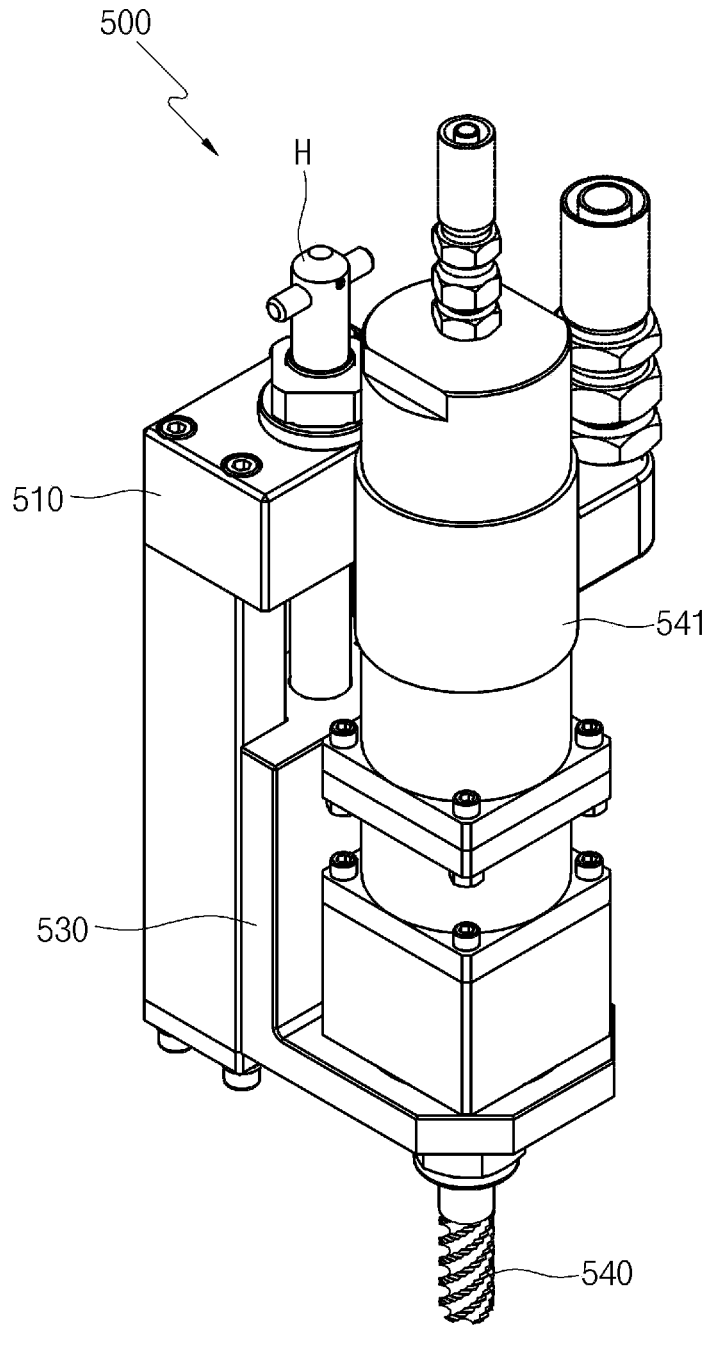
FIG. 9 is a view showing an upper cutting means in the cutting apparatus for a fuel basket accommodating spent nuclear fuel of a heavy water reactor according to the exemplary embodiment of the present disclosure.
Figure 10A:
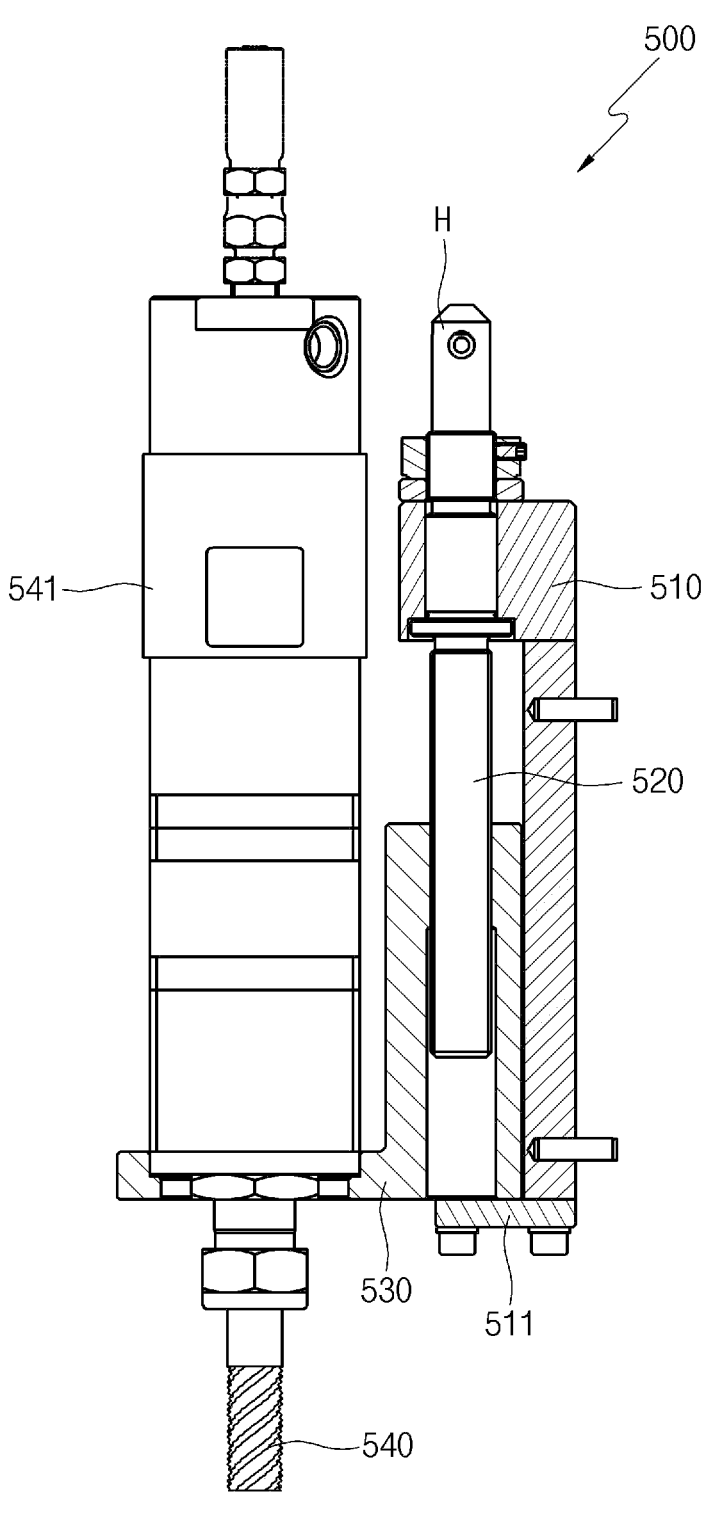
FIGS. 10A and 10B are views showing the operation of the upper cutting means of FIG. 9.
Figure 10B:
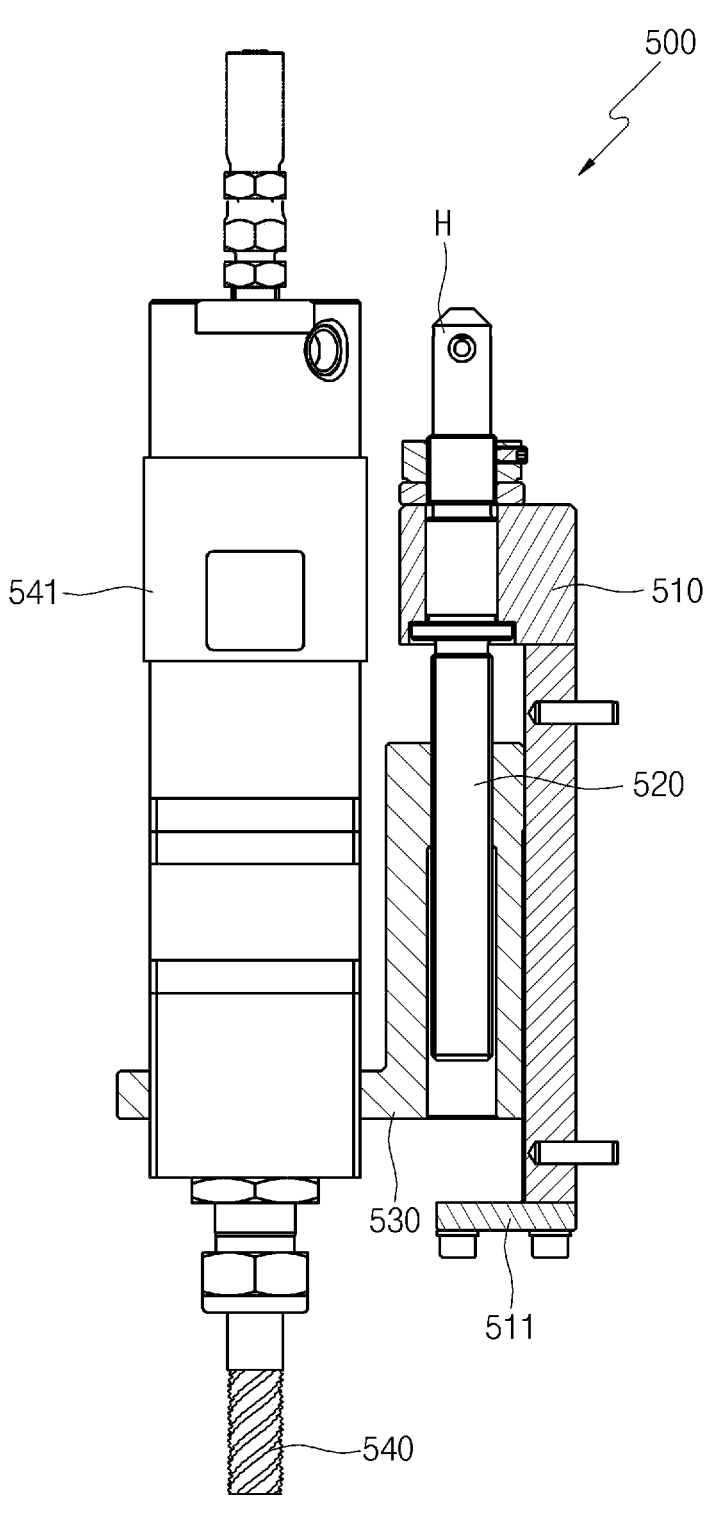

The upper-cutting means 500 is configured to cut the welding bead provided in the upper center of the fuel basket FB and is arranged on the horizontal support 220 as shown in FIGS. 2 and 3. As described above, the fuel basket FB is welded at the lower end of the side and the upper center, and the upper cutting means 500 is configured to cut an upper center welding bead as shown in FIG. 3. Whereas the side-cutting means 400 is configured to move straight toward the side of the fuel basket FB, the upper-cutting means 500 is configured to move straight toward the upper center of the fuel basket FB. As shown in FIGS. 9 to 10B, the upper-cutting means 500 includes a bracket 510, an elevating screw 520, an elevating member 530, and a cutting tip 540. The bracket 510 is configured to be fixed to the horizontal support 220 and provides an elevation path for an elevation member 530 to be described later. A stopper 511 is provided at the lower end part of the bracket 510 to limit excessive descent of the elevating member 530. The elevating screw 520 is arranged to be rotatable in the bracket 510 and provides a screw thread. At this time, the handle shaft H is connected to the upper-end part of the elevating screw 520. The elevating member 530 is screw-coupled with the elevating screw 520 and is arranged so as to elevate by rotation in forward and reverse directions of the elevating screw 520. The cutting tip 540 is configured to cut the upper center of the fuel basket FB and may be provided as an end mill. The cutting tip 540 is arranged on the elevating member 530 and is arranged to be rotatable by an air motor 541.

On the other hand, in the process of cutting the welding beads of the fuel basket (or kinds of the fuel basket) by the cutting means 400 and 500, in reality, not only the welding bead but also the body or lid of the fuel basket (or kinds of the fuel basket) around the welding bead may be cut. When the cutting depth of the body and lid of the fuel basket FB exceeds 50%, there is a concern that the spent nuclear fuel may be damaged. Accordingly, the present disclosure has a technical feature of preventing the fuel basket FB from being subjected to through-cut by sensing the torque of the air motors 451 and 541, that is, the air pressure supplied to the air motors 451 and 541. To this end, a pneumatic sensor for measuring the air pressure supplied to the air motors 451 and 541 is further arranged in the air supply device outside the spent fuel bay, and the illustration of the air supply device and the pneumatic sensor is to be omitted for convenience.

Hereinafter, an operation of cutting the welding bead of the fuel basket through the cutting apparatus configured as described above will be described.

The operator hangs a lifting device on the lifting ring 110 and sinks the cutting apparatus into the spent fuel bay. Thereafter, the operator rotates the handle shafts H arranged on opposite sides of the turn table 300 using a manually operated rod (not shown) corresponding to the depth of the spent fuel bay. The bevel gear 351 and the transmission shaft 352 interlocked by the rotation of the handle shaft H rotate the moving turn plate 353, and while being moved to the edge of the turn table 300 by the rotation of the movable turn plate 353, the clamps 320 allow the turn table 300 to secure the space. Thereafter, the operator manipulates the fuel basket FB to sink in the spent fuel bay using the lifting device and then be seated on the turn table 300. At this time, the positioning hub 310 guides the position of the fuel basket FB while being inserted into the central post previously provided in the fuel basket FB. Next, the operator reversely rotates the handles shaft H of the turn table 300 so that the clamps 320 come into close contact with and restrains the lower end of the fuel basket FB.

Next, the operator makes the cutting tip 450 of the side-cutting means 400 and the cutting tip 540 of the upper-cutting means 500 respectively correspond with the cutting parts of the fuel basket FB. To this end, while rotating the elevating screw 420 in forward and reverse directions by rotating the handle shaft H of the side cutting means 400, the operator moves the cutting tip 450 back and forth toward the fuel basket FB. That is, as shown in FIGS. 8A and 8B, the side cutting means 400 is configured such that as the inclined block 430 is elevated by the rotation of the elevating screw 420, the mount 440 may move in back and forth directions along the inclined plane 431 of the inclined block 430. In addition, as the operator elevates the elevating member 530 as shown in FIGS. 10A and 10B while rotating the elevating screw 520 in forward and reverse directions by rotating the handle shaft H of the upper cutting means 500, the cutting tip 540 may be moved toward the upper center of the fuel basket FB in accordance therewith. Thereafter, when the positions of the cutting tips 450 and 540 correspond to the welding beads of the fuel basket FB, respectively, the operator actuates the air motors 451 and 541 through the air supply device to rotate the side-cutting means 400 and the upper-cutting means 500. Thereafter, the operator rotates the turn table 300 while rotating the handle shaft H connected to the bevel gear 330 of the worm shaft 341.

At this time, the welding bead of the fuel basket FB is cut through the cutting tip. In this case, as described above, not only the welding bead but also the body and lid of the fuel basket FB may be cut, so the operator may monitor the cutting depth of the cutting tip while monitoring the pneumatic sensor arranged in the air supply device. That is, when the air pressure supplied to the air motors 451 and 541 under a cutting operation is high compared to the air pressure reference value of the air pressure sensor preset through the test, the operator stops the operation of the air motors 451 and 541 and takes follow-up measures.

Thereafter, the welding beads of the fuel basket FB are cut by thereof through the cutting means 400 and 500, respectively, and by performing the above-described process in reverse order to release the restraint of the fuel basket FB from the turn table 300, the cutting operation of the fuel basket by the cutting apparatus is completed.

Although the present disclosure has been described in detail with respect to the described embodiments, it is obvious to those skilled in the art that various changes and modifications are possible within the scope of the technical idea of the present disclosure and natural that such changes and modifications belong to the appended claims.

The invention claimed is:

1. A cutting apparatus for a fuel basket accommodating spent nuclear fuel of a heavy water reactor, the cutting apparatus comprising:
   a base;
   a vertical support arranged on one side of the base;
   a turn table arranged to be reciprocated between one side and an opposite side of the base and be horizontally rotatable on the base;
   a horizontal support arranged to extend from an upper-end of the vertical support in a horizontal direction toward the turn table;
   a side-cutting means arranged on the vertical support protruding toward the turn table for cutting a side welding bead of the fuel basket mounted on the turn table; and
   an upper-cutting means arranged on the horizontal support protruding toward the turn table for cutting an upper welding bead of the fuel basket mounted on the turn table,
   wherein the side-cutting means comprises:
   a bracket fixed to the vertical support;
   an elevating screw arranged to be rotatable in the bracket;
   an inclined block screw-coupled with the elevating screw and provided with a downwardly inclined surface to be elevated in a height direction of the bracket by rotation of the elevating screw;
   a mount having an inclined surface corresponding to the inclined surface of the inclined block and arranged for moving straight toward the fuel basket of the turn table with respect to the bracket while cooperating with elevating action of the inclined block; and
   an air motor arranged in the mount and a cutting tip generating rotating force by power of the air motor.

2. The cutting apparatus of claim 1, wherein the base is provided with a scattering-free film in a form of a partition arranged upward along edges thereof.

3. The cutting apparatus of claim 1, wherein the base comprises, thereon:
   guide rails each arranged between one side and the opposite side of the base;
   a transfer table arranged to be movable along the guide rails and allowing the turn table to be arranged thereon;
   a worm wheel in a form of a ring arranged to be rotatable on the transfer table and provided with a toothed gear on a circumferential surface thereof; and
   a worm shaft engaged and coupled with the toothed gear of the worm wheel,
   wherein the turn table is coupled with the worm wheel.

4. The cutting apparatus of claim 1, wherein a plurality of clamps is provided at edges of the turn table to clamp the fuel basket, and a positioning hub to be inserted into a central post of the fuel basket is provided in a center of the turn table.

5. The cutting apparatus of claim 2, wherein the base comprises, thereon:

guide rails each arranged between one side and the opposite side of the base;

a transfer table arranged to be movable along the guide rails and allowing the turn table to be arranged thereon;

a worm wheel in a form of a ring arranged to be rotatable on the transfer table and provided with a toothed gear on a circumferential surface thereof; and a worm shaft engaged and coupled with the toothed gear of the worm wheel, wherein the turn table is coupled with the worm wheel.

6. The cutting apparatus of claim 2, wherein a plurality of clamps is provided at edges of the turn table to clamp the fuel basket, and a positioning hub to be inserted into a central post of the fuel basket is provided in a center of the turn table.

\* \* \* \* \*